United States Patent
Gonzalez (12)

(10) Patent No.: US 9,904,814 B2
(45) Date of Patent: Feb. 27, 2018

(54) SECURE ELEMENT

(71) Applicant: HEWLETT-PACKARD DEVELOPMENT COMPANY, L.P., Houston, TX (US)

(72) Inventor: Donald Gonzalez, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/124,490

(22) PCT Filed: Mar. 18, 2014

(86) PCT No.: PCT/US2014/031053
§ 371 (c)(1),
(2) Date: Sep. 8, 2016

(87) PCT Pub. No.: WO2015/142321
PCT Pub. Date: Sep. 24, 2015

(65) Prior Publication Data
US 2017/0109551 A1 Apr. 20, 2017

(51) Int. Cl.
| | |
|---|---|
| *G06K 7/00* | (2006.01) |
| *H04L 29/06* | (2006.01) |
| *H04W 12/02* | (2009.01) |

(52) U.S. Cl.
CPC ........ *G06K 7/0013* (2013.01); *H04L 63/0428* (2013.01); *H04W 12/02* (2013.01)

(58) Field of Classification Search
CPC .............. G06Q 20/3227; G06K 7/0013; H04L 63/0428; H04W 12/02
USPC ....................................................... 235/383
See application file for complete search history.

(56) References Cited

U.S. PATENT DOCUMENTS

| | | | | |
|---|---|---|---|---|
| 4,774,632 A | * | 9/1988 | Neugebauer | H01L 23/32 257/718 |
| 6,084,308 A | * | 7/2000 | Kelkar | H01L 21/563 257/693 |
| 6,680,525 B1 | * | 1/2004 | Hsieh | H01L 27/14618 257/678 |
| 7,729,121 B1 | * | 6/2010 | Deshpande | H01L 23/3677 165/80.3 |

(Continued)

FOREIGN PATENT DOCUMENTS

| | | |
|---|---|---|
| CN | 103544599 | 1/2014 |
| EP | 2056518 A1 | 5/2009 |

(Continued)

OTHER PUBLICATIONS

"Inside Secure Introduces First Secure Element, as it Seeks to Stay Competitive," Oct. 29, 2012, pp. 1-3, Press Release, INSIDE Secure, France.

(Continued)

*Primary Examiner* — Claude J Brown
(74) *Attorney, Agent, or Firm* — HP Inc. Patent Department

(57) ABSTRACT

A secure element integrated circuit may be mounted to an underside of a bus interface integrated circuit. The bus interface integrated circuit may have a plurality of external contacts and a first plurality of internal contacts. The secure element integrated circuit may have a second plurality of internal contacts coupled to the first plurality of internal contacts.

15 Claims, 5 Drawing Sheets

(56) References Cited

U.S. PATENT DOCUMENTS

| | | | |
|---|---|---|---|
| 8,548,924 B2 | 10/2013 | Yeager | |
| 2004/0150098 A1* | 8/2004 | Lee | H01L 25/0657 257/706 |
| 2004/0195667 A1* | 10/2004 | Karnezos | H01L 23/3135 257/686 |
| 2004/0217485 A1* | 11/2004 | Chung | H01L 21/563 257/778 |
| 2005/0184399 A1* | 8/2005 | Damberg | H01L 23/49816 257/777 |
| 2007/0111388 A1* | 5/2007 | Karnezos | H01L 23/3128 438/108 |
| 2008/0020512 A1* | 1/2008 | Karnezos | H01L 23/3128 438/110 |
| 2008/0303173 A1* | 12/2008 | Hamada | G01R 31/318544 257/777 |
| 2010/0063893 A1 | 3/2010 | Townsend | |
| 2010/0155938 A1* | 6/2010 | Martinez | G06F 17/5068 257/737 |
| 2010/0237484 A1* | 9/2010 | Han | H01L 21/565 257/686 |
| 2011/0031610 A1* | 2/2011 | Yamazaki | H01L 23/4985 257/693 |
| 2012/0112333 A1* | 5/2012 | Liu | H01L 21/4828 257/676 |
| 2012/0130838 A1 | 5/2012 | Koh et al. | |
| 2012/0187578 A1* | 7/2012 | Li | H01L 23/13 257/778 |
| 2012/0317628 A1 | 12/2012 | Yeager | |
| 2013/0093097 A1* | 4/2013 | Yu | H01L 21/568 257/774 |
| 2013/0341414 A1 | 12/2013 | Ziller et al. | |
| 2013/0341796 A1* | 12/2013 | Kalandar | H01L 23/3128 257/773 |
| 2014/0013406 A1 | 1/2014 | Tremlet | |
| 2014/0085829 A1* | 3/2014 | Yamashita | H01L 23/49827 361/717 |
| 2015/0016045 A1* | 1/2015 | Zastrow | H01L 25/0657 361/679.32 |
| 2015/0236756 A1* | 8/2015 | Ballesteros | H04B 5/0031 455/41.1 |

FOREIGN PATENT DOCUMENTS

| | | |
|---|---|---|
| EP | 2626823 A1 | 8/2013 |
| TW | 201310363 A | 3/2013 |
| TW | 201409371 A | 3/2014 |
| WO | WO-2012122648 A1 | 9/2012 |
| WO | WO-2012143653 A1 | 10/2012 |
| WO | WO-2013158419 A1 | 10/2013 |

OTHER PUBLICATIONS

Christopher Cox and Roger Musfeldt, "NFC-Enabled Payments and the Role of the Trusted Service Manager," A First Data White Paper, Feb. 13, 2013, pp. 1-14, First Data Corporation.

* cited by examiner

SECURE ELEMENT

BACKGROUND

Near-field communications (NFC) technology may be used in secure transactions such as contactless payment and loyalty card or coupon use. An NFC contactless payment chipset may include an NFC controller, an NFC antenna, and a secure element (SE). The SE may provide transaction security by providing a secure memory to secure store applications or credentials, such as account numbers or encryption information, or provide a secure execution space for secure execution of transaction-related applications.

BRIEF DESCRIPTION OF THE DRAWINGS

Certain examples are described in the following detailed description and in reference to the drawings, in which.

DETAILED DESCRIPTION OF SPECIFIC EXAMPLES

Point of sale (POS) terminals handle sensitive cardholder information. Various attempts to secure cardholder information have been implemented. For example, the Payment Card Industry Data Security Standard (PCI DSS) has been promulgated by the PCI Security Standards Counsel to increase controls around cardholder data.

PCI DSS compliance may require expensive hardware and manufacturing techniques. For example, certain components, such as the SE, may be required to be housed inside a hardened chassis that is protected from intrusion. Accordingly, POS terminal manufacture may require use of hardened facilities specializing in producing security hardened components. Additionally, POS terminals may require expensive certification procedures. Mobile POS (MPOS) terminals may be implemented using mobile devices such as tablets, smartphones, notebooks, or other PCs. Assembly of the entire mobile device in a hardened facility may be prohibitively expensive.

Aspects of the disclosed technology provide a single package combining an SE and a bus interface chip. The bus interface chip provides a secure interface for the SE to a system bus. For example, the bus interface chip may be an NFC controller. The combined package may be manufactured in a secure manner that can later be integrated into a POS terminal with requiring secure manufacturing or an intrusion protected enclosure. In some examples, the SE is inverted and mounted to the underside of the NFC controller. In these examples, when the NFC controller is mounted on a printed circuit board (PCB) it prevents access to the SE, protecting the SE against various attack vectors.

Figure 1A:
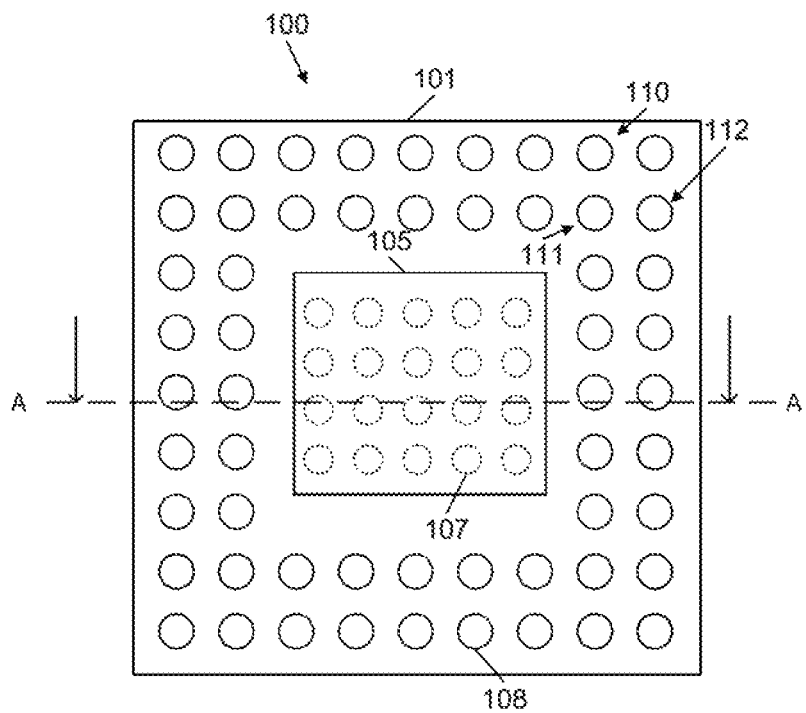
FIG. 1A illustrates an underside view of an example system and FIG. 1B illustrates a side view of the example system along the axis A of FIG. 1A.
Figure 1B:
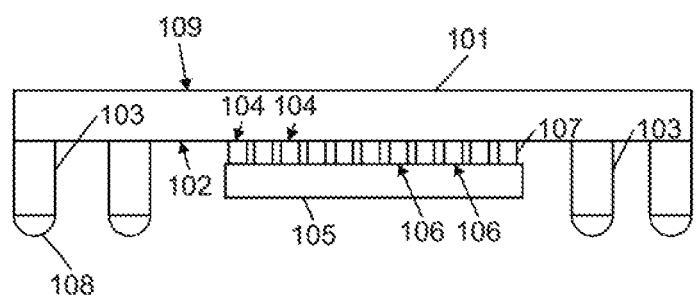

FIG. 1 illustrates an example system 100 having a bus interface chip 101 and an SE 105 coupled to the underside of the bus interface chip 101. FIG. 1A illustrates an underside view of the system 100 and FIG. 1B illustrates a side view of the system 100 along the axis A of FIG. 1A. In some cases, the illustrated system 100 may be installable on a PCB to be used in a MPOS or a smart card. In some implementations, the illustrated system 100 may be manufactured in a secure facility and then integrated into a mobile device such as a smart phone or tablet in another facility. In other implementations, the illustrated system 100 may be integrated into a smart card to be used by a cardholder. For example, the system 100 may be manufactured to meet PCI DSS compliance requirements such that later integration into a further device does not require PCI DSS compliance.

The example system 100 may include a bus interface integrated circuit (IC) 101. The bus interface IC may provide an interface to a system bus for the SE 105. In these examples, the SE 105 may not have a direct connection to the system bus. Instead, communications with the SE 105 may pass through the bus interface IC 101. For example, when the system 100 is installed in a device, the bus interface IC 101 may provide an interface for the SE 105 to the device's Peripheral Component Interconnect (PCI) bus. In some implementations, the bus interface IC 101 may serve other functions. For example, the bus interface IC 101 may be an NFC controller, a Bluetooth or Wi-Fi controller, or a storage controller.

A potential attack on an SE may be a thermal probe attack. In a thermal probe attack, an attacker may try to correlate temperature fluctuations in the chip with chip operations to determine internal operations or data. In some cases, the bus interface IC 101 may perform functions during transactions in which the SE 105 is active. The heat created by the bus interface IC 101 may introduce noise, creating ambiguous readings to a thermal probe attack. For example, in a contactless payment situation, the NFC controller may be active whenever the SE 105 is active. Accordingly, the NFC controller may serve as a suitable bus interface IC 101.

The bus interface IC 101 may have an underside 102. The underside 102 may be the side of the IC 101 that faces the PCB when installed. The IC 101 may also have an upper side 109 that faces away from the PCB when installed and houses the IC's 101 active components. The underside 102 may include a first plurality of internal contacts 104 and a plurality of external contacts 103. For example, the plurality of internal contacts 104 may be traces on the underside of the IC 101 and the plurality of external contacts 103 may be pins extending from the underside of the IC 101 to clear the height of the SE 105. In some implementations, the external contacts 103 may be coupled to solder bumps 108 forming a BGA 110 that surrounds the SE 105.

The system 100 may also include an SE IC 105. The SE 105 may be mounted on the underside of the bus interface IC 101. The SE 105 may include a second plurality of internal contacts 106. For example, the second plurality of internal contacts 106 may electrical traces corresponding to the internal contacts 104 of the bus interface IC 101. The two sets of internal contacts 104 may be coupled, for example by solder connections. For example, the SE 105 may be mounted to the bus interface IC 101 using a solder ball grid array (BGA). In some implementations, the SE 105 lacks any external contacts. Instead, when installed, all power and communication is provided via the bus interface IC 101. Additionally, in some examples, during operation, communications between the SE 105 and the bus interface IC 101 may use session based encryption, where data flowing over connections 107 is encrypted with time limited session keys.

In some implementations, the SE 105 may be mounted on the underside of the bus interface IC 101 such that the plurality of external contacts 103 surrounds the SE 105. The plurality of external contacts 103 may be arranged a nested arrangement surrounding the SE 105. For example, the contacts 103 may be arranged in a plurality of nested arrays or grids 111, 112, with each array 111, 112 surrounding the SE 105. This arrangement creates a plurality of rows and columns surrounding the SE 105. In these implementations, the plurality of external contacts 103 may prevent access to the internal connections 107 when the system 100 is installed. For example, this may impede attack vectors such as power probe or fault injection attacks. Additionally, power probe or fault injection attacks on the external contacts 103 may provide ambiguous results due to the independent operations of the bus interface IC 105, such as NFC control operations.

Figure 2A:
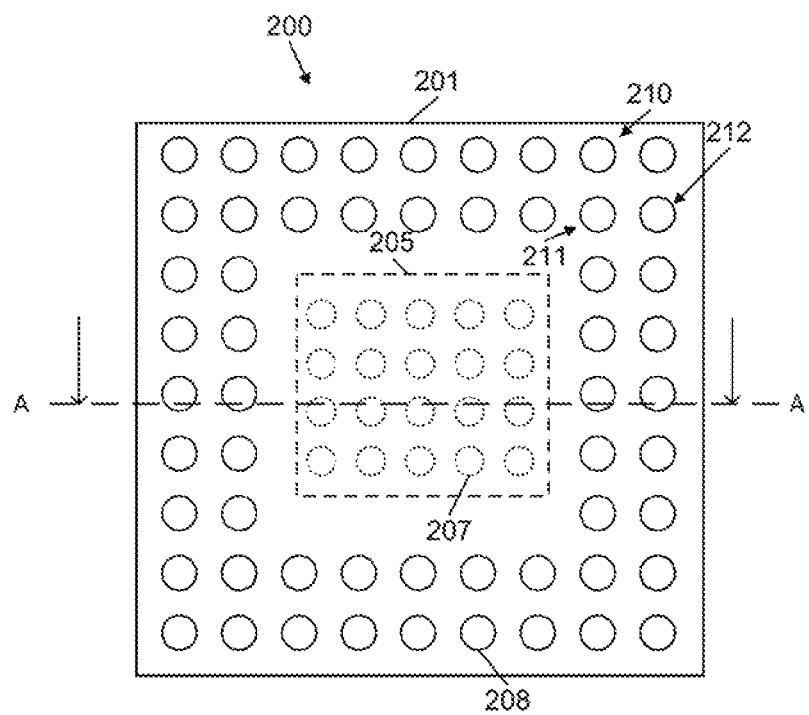
FIG. 2A illustrates an underside view of an example system and FIG. 2B illustrates a side view of the example system along the axis A of FIG. 2A.
Figure 2B:
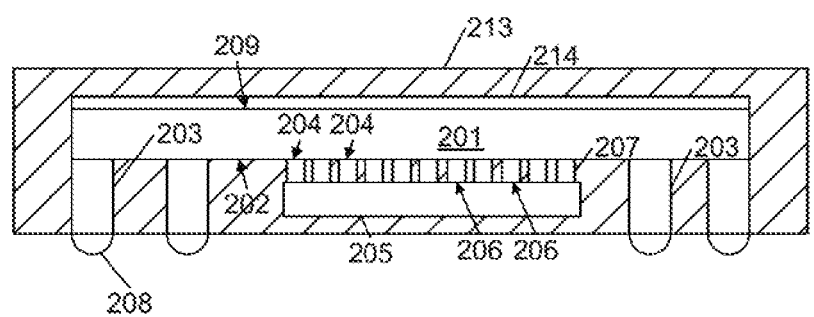

FIG. 2 illustrates an example system 200 having a bus interface IC 201 with a heat spreader 214 and a SE IC 205 in a package 213 encapsulating the devices. FIG. 2A illustrates an underside view of the system 200 and FIG. 2B illustrates a side view of the system 200 along the axis A of FIG. 2A. Similar to the system of FIG. 1, the system 200 may installable on a PCB to be used in an MPOS or a smart card. For example, the illustrated system 200 may be manufactured in a secure facility and then integrated into a mobile device such as a smart phone or tablet in another facility. As another example, the illustrated system 200 may be integrated into a smart card to be used by a cardholder.

The bus interface IC 201 and the SE 205 may be implemented as described with respect to bus interface IC 101 and the SE 105, respectively. For example, the SE 205 may be mounted on the underside 202 of the bus interface IC 201 by connections 207 connecting a first plurality of internal contacts 204 of the IC 201 and a second plurality of internal contacts 206 of the SE 205. In some cases, a plurality of IC 201 external contacts 203 may surround the SE 205 in a nested arrangement 212. For example, nested tiers 210, 211 of solder bumps 208 may form a BGA surrounding the SE 205.

The example system 200 may further include a heat spreader 214. The heat spreader 214 may be coupled to the bus interface IC 201. For example, the heat spreader 214 may be coupled to the bus interface IC 201 on the side 209 of the interface IC 201 opposite the underside 202. The heat spreader 214 may spread heat created by the IC 201 and heat created by the SE 205. This may further impede thermal probe attacks. In some examples, the heat spreader 214 may be a thermally conductive compound, such as a layer of thermally conductive metal or ceramic. For example, a layer of a commercial thermal interface material (TIM) may be used as the heat spreader 214.

The example system 200 may further include a package 213 encapsulating the bus interface IC 201 and SE IC 205. In some cases, the package 213 may encapsulate the first and second pluralities of internal contacts 204, 206. In some implementations, the package 213 may be a semiconductor package housing the devices 201, 205. For example, package 213 may be a molded epoxy plastic or ceramic package. In other implementations, the package 213 may be an epoxy or other sealant that secures or hardens the devices against certain attack vectors. In some implementations, the package 213 may incorporate intrusion detection features. Such intrusion detection features allow attacks to be detected and countermeasures performed. For example, if an intrusion is detected, the SE's 205 data may be deleted. In some cases, a power source in the IC 201 or SE 205 may be connected to the package 213 allowing the chip to detect if the package is broken or removed. For example, the package 213 may include fusible links that are bridged if the package is broken.

Figure 3:
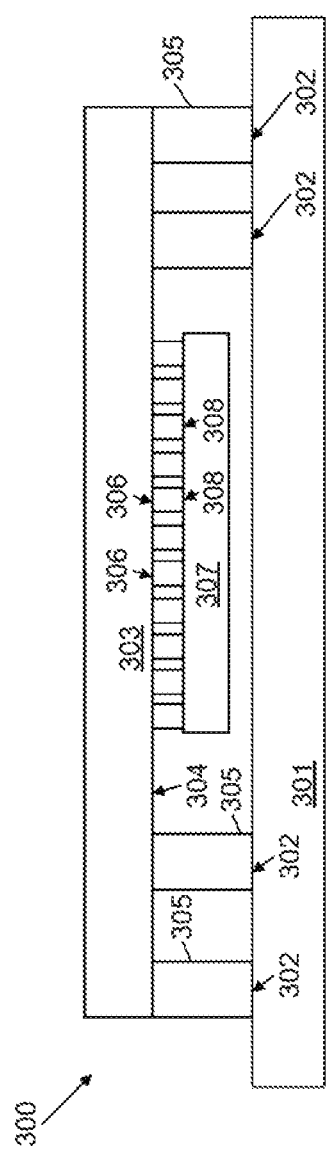
FIG. 3 illustrates an example point-of-sale (POS) terminal having an NFC controller and an SE mounted on the NFC controller.

FIG. 3 illustrates an example POS terminal 300 having an NFC controller 303 and an SE 307 mounted on the NFC controller 303. In some implementations, the POS terminal 300 may be integrated into a mobile device such as a tablet, smart phone, or laptop computer. In other implementations, the POS terminal 300 may be a peripheral or an independent device.

The POS terminal 300 may include a PCB 301. The PCB 301 may include an array of electrical contacts 302. For example, the array of electrical contacts 302 may be signal traces arranged to accommodate a BGA for mounting the NFC controller 303. For example, the array of electrical contacts 302 may be arranged as described with respect to nested arrangements 112 and 212 of FIGS. 1 and 2, respectively.

The POS terminal 300 may further include an NFC controller 303. The NFC controller 303 may control near-field communications for the POS terminal 300. For example, the NFC controller 303 may use a near-field antenna to communicate with a corresponding NFC controller of a cardholder to exchange information conduct a financial transaction. For example, the NFC controller 303 may allow the POS terminal 300 to conduct payment transactions, loyalty card transactions, or coupon transactions.

The example NFC controller 303 includes an underside 304 facing the PCB 301. The underside 304 may include an array of external contacts 305 coupled to the electrical contacts 302 of the PCB 301. For example, the electrical contacts 305 may be contacts coupled to the electrical contacts 302 by soldering a BGA.

The underside 304 may further include a first array of internal contacts 306. For example, the first array of internal contacts 306 may be electrical traces on the underside 304 of the NFC controller 303 to allow the SE 307 to be mounted to the underside 304.

The POS terminal 300 may further include an SE 307. The SE 307 may include a second array of internal contacts 308. The second array of internal contacts 308 may be coupled to the first array of internal contacts 306. For example, the contacts 306, 308 may be coupled by solder connections.

In some implementations, the NFC controller 303 may provide an interface to the SE 307. For example, the NFC controller 303 may provide power and round to the SE 307 via contacts 306, 308. Additionally, the NFC controller 303 may serve as a bus interface for the SE 307 as described above.

Figure 4:
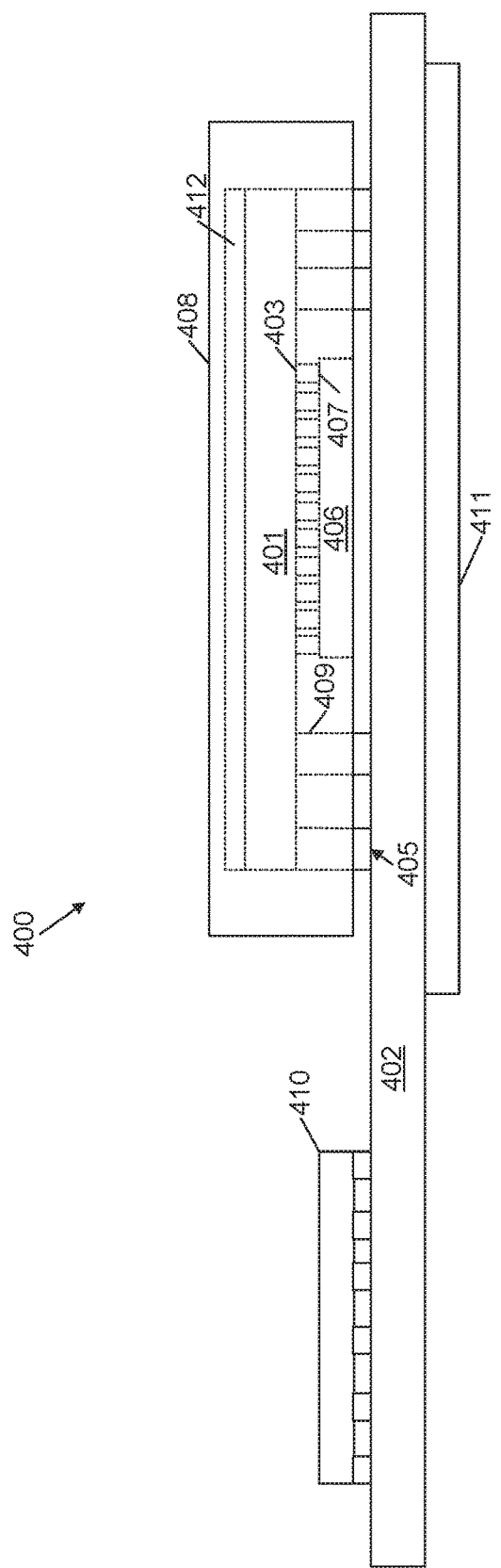
FIG. 4 illustrates an example POS terminal including a heat spreader and a processor.

FIG. 4 illustrates an example POS terminal 400 including a heat spreader 411 and a processor 410. In some implementations, the POS terminal 400 may be integrated into a mobile device such as a tablet, smart phone, or laptop computer. In other implementations, the POS terminal 400 may be a peripheral or an independent device.

Similarly to the example POS terminal 300, the POS terminal 400 may include a PCB 401 including an array of electrical contacts 405. The electrical contacts 405 may be arranged as described with respect to nested arrangements 112 and 212 of FIGS. 1 and 2, respectively.

The POS terminal 400 may include an NFC controller 401 mounted to the PCB 402. For example, the NFC controller 401 may be mounted on the PCB 402 using a plurality of solder connections 405 coupled to an array of external contacts 409. The NFC controller 401 may further include a first array of internal contacts 403. In some implementations, the NFC controller 401 may include a heat spreader 412. For example, the heat spreader 412 may be implemented as described with respect to heat spreader 214 of FIG. 2.

The POS terminal 400 may further include an SE 406 mounted to the underside of the NFC controller 401. For example, the SE 406 may include a second array of internal contacts 407 coupled to the first array of internal contacts 403. As described with respect to FIG. 3, the NFC controller 401 may provide an interface to the SE 406. For example, all electrical connections, such as ground, power, and communications, of the SE 406 may be provided through the external contacts 409 to the NFC controller 401. The NFC controller 401 may pass the communications and provide ground and power to the SE 406 via the internal contacts 403, 407.

The POS terminal 400 may further include a package 408. The package 408 may encapsulate the NFC controller 401 and the SE 406. In some implementations, the package 408 may encapsulate the first and second arrays of internal contacts 403, 407. In some implementations, the package 804 may be as described with respect to the package 213 of FIG. 2.

The POS terminal 400 may further include a treat spreader 411 mounted on the PCB 402 opposite the NFC controller 401. For example, the NFC controller 401 defines an upper side of the PCB 402 the heat spreader 411 may be mounted on the underside of the PCB 402 under the SE 406. The heat spreader 411 may impede thermal probe attacks conducted on the underside of the PCB 402 by distributing and mixing the heat caused by the NFC controller 401 and the SE 406. The heat spreader 411 may be composed of materials similar to that of heat spreaders 412 and 214. Alternatively, the heat spreader 411 may be composed of other materials that are unsuitable for mounting directly on chips.

The POS terminal 400 may further include a processor 410. For example, the processor 410 may execute software to allow the POS 400 to conduct transactions, such as financial transactions using the NFC controller 401. The processor 410 may be coupled to the NFC controller 401 to communicate with the SE 406 via the NFC controller 401. For example, the processor 410 and the NFC controller 401 may be coupled to a system bus, such as PCI bus. In some implementations, the processor 410 may address communications for the SE 406 to the NFC controller 401. In other implementations, the SE 406 may appear on the system bus, and the processor 410 may address communication for the SE 406 to the SE 406. Those communications may be intercepted by the NFC controller 401 and provided to the SE 406 in a secure manner. In some cases, the processor 410 may be mounted on the PCB 402. In other cases, the processor 410 may be connected to the PCB 402 using connectors and interconnects.

Figure 5:
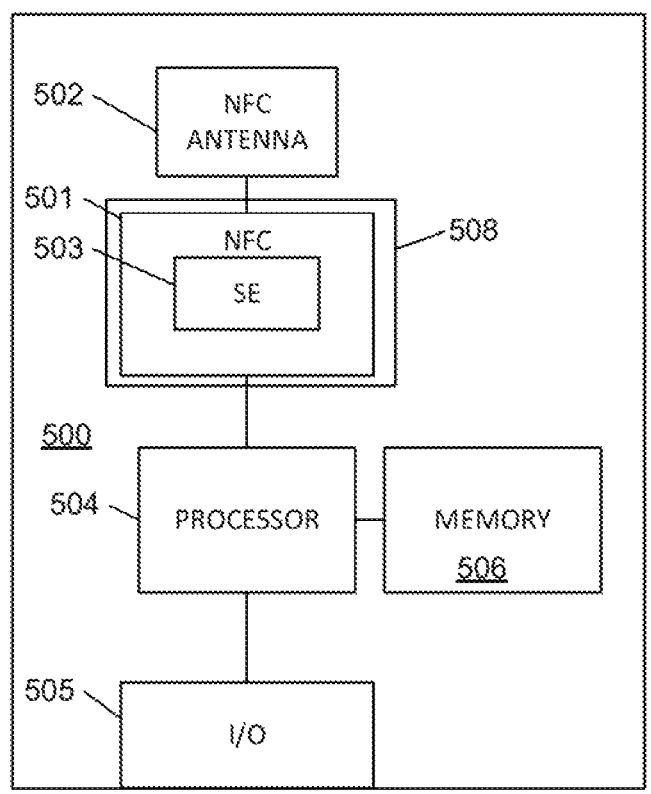
FIG. 5 illustrates an example mobile device including NFC controller having an SE coupled to an underside of the NFC controller.

FIG. 5 illustrates an example mobile device 500 including an NFC controller 503 having an SE 502 coupled to an underside of the NFC controller 503. In some implementations, the example mobile device 500 may be able to act as a mobile POS as described above. For example, the mobile device 500 may be an implementation of an example POS of FIG. 3 or FIG. 4.

The mobile device 500 may include an NFC controller 501 and an SE 503. The NFC controller 501 and SE 503 may be as described with respect to NFC controller 303 and SE 307 or 401 and 406 of FIG. 3 or 4, respectively. For example, the SE 503 may be coupled to an underside of the NFC controller 501 and surrounded by external electrical contacts of the NFC controller 501. In some implementations, the NFC 501 may be coupled to a heat spreader, such as heat spreader 412 of FIG. 4.

The mobile device 500 may further include an NFC antenna 502. The NFC antenna 502 may allow the NFC controller 501 to send and receive near-field communications. For example, the NFC antenna 502 may allow the NFC controller 501 to pair with an NFC sub-system on a cardholder's device to conduct a financial transaction.

Additionally, in some implementations, the NFC 501 may be coupled to a PCB 508. For example, the PCB 508 may be as described with respect to PCB 402 of FIG. 4. In these implementations, the PCB 508 may have a heat spreader coupled to the PCB opposite the NFC controller, such as heat spreader 411 of FIG. 4.

The mobile device 500 may further include a processor 504. For example, the processor may be as described with respect to processor 410 of FIG. 4 and may communicate with the SE 503 via the NFC controller 501. For example, the NFC controller 501 may serve as a bus interface for the SE 503 to allow the processor 504 and SE 503 to communicate on a system bus.

Additionally, the mobile device 500 may include other components, such as a memory 506 and input/output (I/O) components 505. The memory 506 may include non-transitory computer readable media such as random-access memory, flash memory, or storage. The I/O 505 may include keyboards, screens, touch screens, wireless or wired network transceivers, or other communication devices. For example, the memory 506 may store computer executable instructions to cause the processor 504 to use the NFC controller 501 to conduct a transaction, such as a financial transaction. For example, the instructions may cause the processor 504 to use the SE 503 for secure data storage or secure program execution. The processor 504 may transmit transaction-related instructions addressed to the SE 503 on a system bus. These communications may be intercepted and relayed to the SE 503 by the NFC controller 501 in a transparent manner. Alternatively, the processor 504 may transmit transaction-related instructions for the SE 503 to the NFC controller 501. In these cases, the NFC controller 501 may serve as a hub for the SE 503.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A system, comprising:
   a bus interface integrated circuit (IC) having an underside comprising a first plurality of internal contacts and a plurality of external contacts; and
   a secure element IC mounted on the underside of the bus interface IC, the secure element IC comprising a second plurality of internal contacts coupled to the first plurality of internal contacts,
   wherein the second plurality of internal contacts of the secure element IC are arranged on an upper side of the secure element IC to face the first plurality of internal contacts of the bus interface IC, and wherein the plurality of external contacts of the bus interface IC are arranged to surround the secure element IC to impede power probe or fault injection attacks.

2. The system of claim 1, wherein the bus interface IC further comprises a near-field communications (NFC) controller.

3. The system of claim 1, wherein the plurality of external electrical contacts comprises an array surrounding the secure element IC.

4. The system of claim 1, further comprising a package encapsulating the bus interface IC and the secure element IC.

5. The system of claim 4, wherein the package encapsulates the first and second pluralities of internal contacts.

6. The system of claim 1, comprising a heat spreader coupled to an upper side of the bus interface IC to spread heat created by the bus interface IC and the secure element IC, obscure external thermal readings, and thereby impede thermal probe attacks.

7. A point of sale terminal, comprising:
a printed circuit board (PCB) comprising an array of electrical contacts;
a near-field communications (NFC) controller comprising an underside, the underside comprising:
an array of external contacts coupled to the array of electrical contacts; and
a first array of internal contacts; and
a secure element comprising a second array of internal contacts coupled to the first array of internal contacts,
a heat spreader mounted on an underside of the PCB opposite the NFC controller, the heat spreader is to obscure external thermal readings and thereby impede thermal probe attacks conducted on the underside of the PCB by distributing and mixing heat caused by the NFC controller and the secure element;
wherein the NFC controller is to provide an interface to the secure element,
wherein the second array of internal contacts of the secure element are arranged on an upper side of the secure element to face the first array of internal contacts of the NFC controller, and
wherein the array of external contacts of the NFC controller are arranged to surround the secure element to impede power probe or fault injection attacks.

8. The point of sale terminal of claim 7, further comprising a second heat spreader mounted on the PCB opposite the NFC controller.

9. The point of sale terminal of claim 7, further comprising a processor coupled to the NFC controller to communicate with the secure element via the NFC controller.

10. The point of sale terminal of claim 7, wherein the NFC controller and the secure element are encapsulated in a package.

11. The point of sale terminal of claim 10, wherein the package encapsulates the first and second arrays of internal contacts.

12. The point of sale terminal of claim 7, wherein the second array of internal contacts of the secure element are arranged on an upper side of the secure element to face the first array of internal contacts of the NFC controller.

13. A mobile device, comprising:
a near-field communications (NFC) controller;
an NFC antenna coupled to the NFC controller;
a secure element coupled to an underside of the NFC controller and surrounded by external electrical contacts of the NFC controller; and
a processor coupled to the NFC controller to communicate with the secure element via the NFC controller,
wherein the NFC controller is coupled to a printed circuit board (PCB), and further comprising:
a first heat spreader coupled to an upper side of the NFC controller opposite the secure element; and
a second heat spreader coupled to an underside of the PCB opposite the NFC controller,
wherein the first and second heat spreaders are to spread heat created by the NFC controller and the secure element to obscure external thermal readings, and to thereby impede thermal probe attacks, and
wherein the external contacts of the NFC controller are arranged to surround the secure element to impede power probe or fault injection attacks.

14. The mobile device of claim 13, wherein the external electrical contacts of the NFC controller comprise a nested arrangement of solder connections surrounding the secure element and coupling the NFC controller to a printed circuit board.

15. The mobile device of claim 13, comprising a number of internal contacts arranged on an upper side of the secure element to face a number of internal contacts of the NFC controller.

* * * * *

UNITED STATES PATENT AND TRADEMARK OFFICE
CERTIFICATE OF CORRECTION

PATENT NO. : 9,904,814 B2
APPLICATION NO. : 15/124490
DATED : February 27, 2018
INVENTOR(S) : Gonzalez It is certified that error appears in the above-identified patent and that said Letters Patent is hereby corrected as shown below:

In the Claims

Column 8, Claim 13, Line 32, delete "element" and insert -- element, --, therefor.

Signed and Sealed this
Tenth Day of July, 2018

Andrei Iancu
*Director of the United States Patent and Trademark Office*